US012636857B2

(12) United States Patent
Luttwak et al.

(10) Patent No.: US 12,636,857 B2
(45) Date of Patent: May 26, 2026

(54) MULTI-LAYER COMPOSITE LAMINATE AND METHOD OF FORMING MULTI-LAYER COMPOSITE LAMINATE WITH ASYMMETRIC THICKNESS FILM INPUTS

(71) Applicant: Lingrove Inc., San Francisco, CA (US)

(72) Inventors: Joseph E. Luttwak, Mill Valley, CA (US); Mark Emmet Hiemstra, San Francisco, CA (US); Jacob Klatt, Monte Sereno, CA (US)

(73) Assignee: Lingrove Inc., San Rafael, CA (US)

( * ) Notice: Subject to any disclaimer, the term of this patent is extended or adjusted under 35 U.S.C. 154(b) by 567 days.

(21) Appl. No.: 18/068,606

(22) Filed: Dec. 20, 2022

(65) Prior Publication Data

US 2024/0198631 A1      Jun. 20, 2024

(51) Int. Cl.
| | |
|---|---|
| B32B 7/03 | (2019.01) |
| B32B 5/02 | (2006.01) |
| B32B 7/12 | (2006.01) |
| B32B 27/12 | (2006.01) |
| B32B 27/36 | (2006.01) |
| B32B 37/12 | (2006.01) |
| B32B 37/14 | (2006.01) |

(52) U.S. Cl.
CPC ............... *B32B 7/03* (2019.01); *B32B 5/022* (2013.01); *B32B 7/12* (2013.01); *B32B 27/12* (2013.01); *B32B 27/36* (2013.01); *B32B 37/12* (2013.01); *B32B 37/144* (2013.01); *B32B 2250/05* (2013.01); *B32B 2262/065* (2013.01); *B32B 2305/20* (2013.01); *B32B 2607/02* (2013.01)

(58) Field of Classification Search
CPC .. B32B 7/03; B32B 5/022; B32B 7/12; B32B 27/12; B32B 27/36; B32B 37/12; B32B 37/144; B32B 2250/05; B32B 2262/065; B32B 2305/20; B32B 2607/02
See application file for complete search history.

(56) References Cited

U.S. PATENT DOCUMENTS

| | | | |
|---|---|---|---|
| 3,477,330 A | 11/1969 | Bert | |
| 5,738,924 A | 4/1998 | Sing | |
| 5,918,930 A | 7/1999 | Kawai et al. | |
| 6,107,552 A | 8/2000 | Coomar et al. | |
| 9,818,380 B2 | 11/2017 | Luttwak | |
| 2001/0031594 A1 | 10/2001 | Perez et al. | |
| 2005/0008815 A1* | 1/2005 | Sukigara | C08J 5/18 |
| | | | 264/165 |

(Continued)

OTHER PUBLICATIONS

Obataya, E., et al., "Vibrational properties of wood along the grain," Journal of Materials Science, Jun. 2000, vol. 35, Issue 12, pp. 2993-2994.

(Continued)

*Primary Examiner* — Frank J Vineis
*Assistant Examiner* — Laura B Figg
(74) *Attorney, Agent, or Firm* — Banner & Witcoff, Ltd.

(57) ABSTRACT

A laminate with improved substrate shape resemblance and moisture resistance may include a plurality of layers. The plurality of layers may be structured in various orders, or layups. Each layer of the plurality of layers may have a specific thickness, weight/areal density, and/or other features, such as orientation, relative to one or more of the other layers.

17 Claims, 15 Drawing Sheets

(56)  References Cited

U.S. PATENT DOCUMENTS

| | | | |
|---|---|---|---|
| 2005/0123744 A1* | 6/2005 | Mohanty | B32B 27/22 |
| | | | 264/638 |
| 2008/0110318 A1 | 5/2008 | Fox | |
| 2009/0123706 A1 | 5/2009 | Takahashi | |
| 2009/0155522 A1 | 6/2009 | Raghavendran et al. | |
| 2010/0282407 A1 | 11/2010 | van der Zwan et al. | |
| 2012/0015176 A1* | 1/2012 | Riebel | B32B 21/14 |
| | | | 428/521 |
| 2014/0205820 A1 | 7/2014 | Savonuzzi et al. | |
| 2014/0243771 A1 | 8/2014 | Konishi et al. | |
| 2015/0101473 A1 | 4/2015 | Seal | |
| 2015/0118436 A1 | 4/2015 | Fink | |
| 2017/0009108 A1 | 1/2017 | Mitchell et al. | |
| 2018/0002932 A1 | 1/2018 | Van Giel et al. | |
| 2018/0117884 A1 | 5/2018 | Luttwak | |
| 2020/0055294 A1* | 2/2020 | Yoshizaki | B32B 5/12 |
| 2020/0338867 A1* | 10/2020 | Luttwak | B32B 21/02 |

OTHER PUBLICATIONS

Mar. 7, 2024—(WO) ISR and Written Opinion—App PCT/US2023/085144.

* cited by examiner

MULTI-LAYER COMPOSITE LAMINATE AND METHOD OF FORMING MULTI-LAYER COMPOSITE LAMINATE WITH ASYMMETRIC THICKNESS FILM INPUTS

RELATED APPLICATION DATA

This application relates to U.S. application Ser. No. 16/872,293 filed on May 11, 2020, which claims priority to U.S. Application No. 62/865,112 filed on Jun. 21, 2019, and is a continuation-in-part application of U.S. application Ser. No. 15/788,767 filed on Oct. 19, 2017, which claims priority to U.S. Application No. 62/446,809 filed on Jan. 16, 2017, and is a continuation-in-part application of Ser. No. 14/546,518 filed on Nov. 18, 2014, now U.S. Pat. No. 9,818,380, which claims priority to U.S. Application No. 61/905,572 filed on Nov. 18, 2013. Each of the above applications are incorporated herein by reference in their entirety for all non-limiting purposes.

FIELD

Aspects described herein generally relate to bio-based and sustainable laminates for substrates. More specifically, aspects relate to bio-based and sustainable laminates for applying to a substrate surface, wherein the laminates comprise a plurality of layers. The plurality of layers may be structured in various orders, or layups, to provide advantageous qualities. For example, the plurality of layers may define a top surface and an application surface, wherein, after the application surface is applied to a substrate surface, the top surface substantially resembles the shape of the substrate surface (for example, the top surface is substantially flat where the substrate surface is substantially flat). As another example, the plurality of layers may provide moisture resistance. Aspects further relate to methods of manufacture of laminates, including laminates comprising layers described herein.

BACKGROUND

In certain climates and/or environments, such as those with changing relative humidity and/or high relative humidity, a laminate may experience a number of issues due to moisture, such as warping, curling, discoloration, degradation, and related problems. These issues can be disadvantageous in certain applications on which the laminate may be used, such as those exposed to elevated relative humidity, including, for example, furniture, walls, floors, ceilings, panels, doors in living spaces, and transportation interiors.

One solution to address the moisture-related issues described above is applying a secondary finishing process, such as painting a clear coat made of polyurethane, polyester, or other commonly used paints, to encapsulate a portion of the laminate, thereby reducing moisture absorption by the resin and fibers. As another example, the chemicals used for finishing may be volatile organic compounds (VOCs) and may be, for example, carcinogenic and/or subject to regulations, such as California Proposition 65. Solutions that use non-VOCs for finishing typically may not be abrasion resistant and/or moisture resistant. As yet another example, finishing textures are limited.

Further, laminates can include film layers with biaxial orientations. In certain situations, usage of biaxial film layers can lead to shrinkage when exposed to elevated temperatures, particularly during the impregnation process.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of this disclosure are directed to bio-based laminates having increased performance abilities, such as moisture resistance and the ability to remain flat relative to the substrates on which they are applied. More specifically, aspects of the disclosure are directed to laminates that comprise layers structured in various orders, or layups. Further aspects of this disclosure are directed to manufacture of laminates, including processes for producing laminates comprising layers described herein and processes that solve shrinkage-related issues associated with laminates that include certain types of layers. It is unexpected that a bio-based laminate can achieve certain performance characteristics. Bio-based materials have been typically avoided and have been regarded as inadequate mechanically. However, the examples discussed herein have overcome these deficiencies despite being bio-based.

BRIEF DESCRIPTION OF THE DRAWINGS

A more complete understanding of the present disclosure and certain advantages thereof may be acquired by referring to the following detailed description in consideration with the accompanying drawings, in which like reference numbers indicate like features, and wherein.

DETAILED DESCRIPTION

Figure 1A:
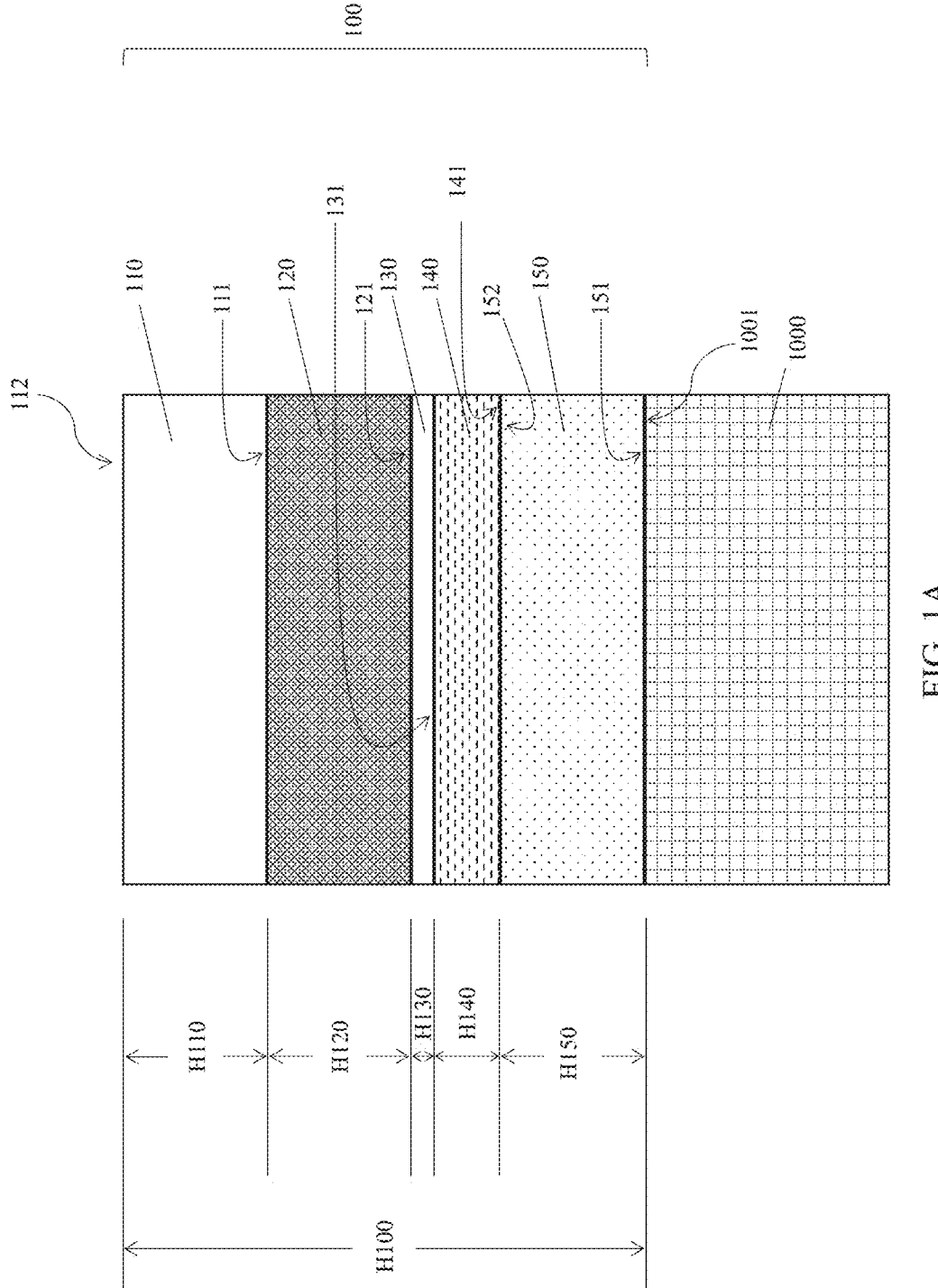
FIG. 1A illustrates a cross-sectional view of an exemplary laminate applied to a flat substrate according to one or more aspects of the disclosure.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Also, while the terms "top," "middle," "bottom," and the like may be used in this specification to describe various example features and elements of the disclosure, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this disclosure. Also, the reader is advised that the attached drawings are not necessarily drawn to scale.

FIGS. 1A-6 illustrate cross-sectional views of various laminates configured to be applied to a surface of a substrate. The substrate may be one of a number of items that require or benefit from application of a laminate, for example and without limitation, a piece of furniture, a wall, a floor, a ceiling, a panel, a door, exterior cladding, one or more components of transportation vehicles including various interior and/or exterior parts (e.g., a dashboard, floor panel, door panel, seat back, body panel, crash pad, instrument panel, center console, ceiling, load floor and the like), a musical instrument, a tube, a hand tool, a kitchen utensil, a storage container, a sporting device (e.g., a surfboard, snowboard, skate board, wakeboard, ski, scooter, kit board, stand-up paddle board, racket, paddle, fishing rod, and/or hiking/ski pole, bicycle, trike, and the like). Accordingly, and for example, the laminates described herein can be used as wall coverings, wall panels, cabinets, built-ins, desks, tables, flooring coverings, ceiling coverings, exterior cladding coverings, panel skins, veneer, and the like. It is also contemplated that the example laminates herein could be implemented as standalone products not applied to a substrate or a substrate surface.

As shown in FIGS. 1A-6, the laminate may include a plurality of layers. The order in which the layers are structured, sometimes referred to as the layup of the layers, may vary, for example, based on the substrate on which the laminate is to be applied and/or based on the desired properties of the laminate. Further, each layer included in the plurality of layers may vary in thickness, weight/areal density, and/or other features relative to the other layers. The examples discussed herein can be used as a platform allowing for a greater flexibility in specifications including aesthetics, thickness, and translucency with low carbon inputs.

FIG. 1A illustrates one embodiment of a laminate 100 according to the present disclosure. As shown in FIG. 1A, the plurality of layers includes a first resin layer 110 followed by a natural fiber layer 120, a second resin layer 130, a non-woven textile layer 140, and a backing layer 150.

The first resin layer 110 and the second resin layer 130 may be comprised of a thermoplastic resin, such as polylactic acid (PLA), polypropylene (PP), polyethylene terephthalate (PET), polyethylene terephthalate glycol (PET-G), acrylic (PMMA), polyurethane (PU), Thermoplastic urethane (TPU), Bio thermoplastic urethane (bioTPU), polyethylene (PE), polyethylene furanoate (PEF), high-density polyethylene (HDPE), ultra-high-molecular-weight polyethylene (UHMWPE), low-density polyethylene (LDPE), polyhydroxyalkanoates (PHA), polybutylene succinate (PBS), polycarbonate (PC), and/or polyamide (PA), and/or may be comprised of a bio-based resin, including relevant resins above and those derived from plants, such as corn, cassava, sugar, soy, cellulose, and/or switchgrass. In one example, the first resin layer 110 and the second resin layer 130 may both be comprised of polylactic acid (PLA). Further, the first resin layer 110 and the second resin layer 130 may be oriented, such as biaxially, or may be non-oriented.

The natural fiber layer 120 may be comprised of materials known to those skilled in the art, such as cotton, flax, cellulose, sisal, ramie, hemp, jute, agave, abaca, coir, nettle, bagasse, and/or water hyacinth. The natural fiber layer 120 may be uni-directional, bi-directional, woven, stitched, bi-axial oriented, discontinuous, and/or continuous. The non-woven textile layer 140 may be one of a number of types known to those skilled in the art, such as staple, airlaid, flashspun, needlepunching/needlefelting, through air bonding, meltblown, spunlace (hydroentanglement), spunlaid (spunbound), spunmelt/SMS, and/or wetlaid, and may be comprised of materials known to those skilled in the art, such as polylactic acid (PLA), polyester, polyamide, rayon, polyethylene terephthalate glycol (PET-G), polyethylene terephthalate (PET), polypropylene (PP), wood pulp, cotton, and/or in combination with both synthetic and natural fibers. In one particular example, the non-woven textile layer 140 may be comprised substantially of polyester.

The backing layer 150 may be comprised of materials known to those skilled in the art, such as cellulose, cork rollstock, cardboard, cardstock, hardboard, paper, and/or paperboard. Other films, such as, for example, films made of minerals, metal foils, and/or synthetic textiles, may also be used.

Figure 1B:
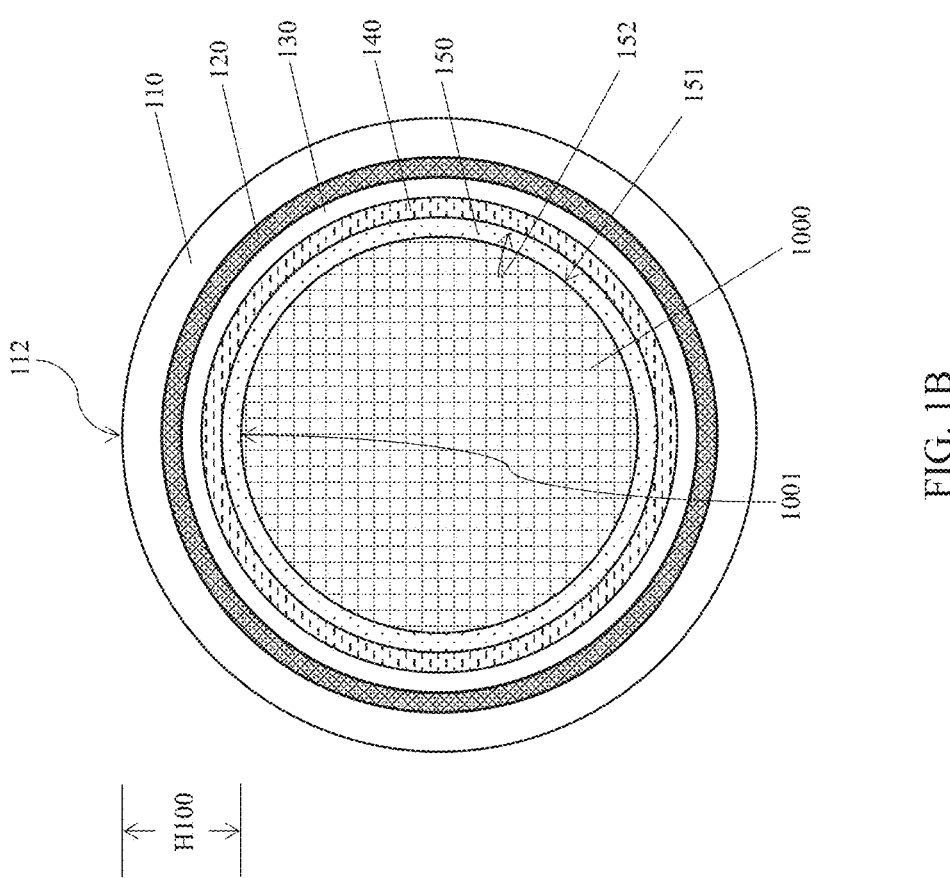
FIG. 1B illustrates a cross-sectional view of another exemplary laminate applied to a cylindrical substrate according to one or more aspects of the disclosure.

In some embodiments, such as the one shown in FIG. 1A, the backing layer 150 may be the innermost layer from the substrate 1000. The backing layer 150 may have an inner surface 151 configured to be applied to and abut the substrate surface 1001. The backing layer 150 may also have an outer surface 152. The first resin layer 110 may be the outermost layer from the substrate 1000. The order, or layup, of the plurality of layers in the embodiment shown in FIG. 1A may advantageously allow for an outer surface 112 of the first resin layer 110 to be at a distance H100 that is substantially uniform at substantially all points along the substrate surface 1001. In embodiments where the substrate surface 1001 is substantially flat as shown in FIG. 1A (for example, where the substrate 1000 is a flat wall), the outer surface 112 of the first resin layer 110 is also substantially flat and is thus substantially parallel to the substrate surface 1001 where distance H100 is substantially uniform at substantially all points along the substrate surface 1001. In other embodiments where the substrate surface 1001 is not substantially flat as shown in FIG. 1B (for example, where the substrate 1000 is cylindrical in shape), the outer surface 112 of the first resin layer 110 substantially resembles the shape of the substrate surface 1001 where distance H100 is substantially uniform at substantially all points along the substrate surface 1001.

In another example, a texturing can be applied to the top layer (the first resin layer 110 in the embodiments illustrated in FIGS. 1A and 1B), which can include any roughness or pattern that breaks up a uniform appearance of the material, including one or more of waves, ridges, channels, protuberance, shapes, etc. This may in certain examples, provide a more scratch resistant layup. Such texturing can be applied to any of the examples discussed herein.

The thickness of each layer, the weight/areal density of each layer, and/or other features, such as orientation, of each layer of the embodiment shown in FIG. 1A may further increase moisture resistance and allow for distance H100 to remain substantially uniform at substantially all points along the substrate surface 1001, including in certain climates and/or environments, such as those with changing relative humidity and/or high relative humidity, for example, equal to or greater than 40%. In this way, moisture-related issues, such as warping, curling, discoloration, and/or degradation of the laminate 100, are minimized. In one example, the second resin layer 130 may be configured to help to maintain distance H100 substantially uniform along the substrate surface.

For example, in one embodiment, the laminate 100 may have a total thickness of approximately 0.3 mm to 0.9 mm. The first resin layer 110 may have a thickness H110 of approximately 6 mils to 12 mils, and in one particular example, may be about 10 mils., where one mil is one-thousandth of an inch, 0.001 inch., or 0.0254 mm (millimeter). In one embodiment, thickness H110 of the first resin layer 110 may be substantially uniform at all points throughout the laminate 100. In another embodiment, thickness H110 of the first resin layer 110 may vary at different points throughout the laminate 100. The natural fiber layer 120 may have a thickness H120 of approximately 0.15 mm and may have a weight/areal density of approximately 50 GSM to 440 GSM, and in one example, about 110 GSM. In one embodiment, thickness H120 and weight/areal density of the natural fiber layer 120 may be substantially uniform at all points throughout the laminate 100. In another embodiment, thickness H120 and weight/areal density of the natural fiber layer 120 may vary at different points throughout the laminate 100. The second resin layer 130 may have a thickness H130 of approximately 1.5 mils to 5 mils, and in one example, about 1.5 mils. In one example the first resin layer 110 thickness H110 and the second resin layer 130 thickness H130 can have a ratio of greater than 3 and in certain instances can be 1.2 to 8. In one particular example, the first resin layer 110 thickness H110 and the second resin layer 130 thickness H130 can have a ratio of 6.66. In one embodiment, thickness H130 of the second resin layer 130 may be substantially uniform at all points throughout the laminate 100. In another embodiment, thickness H130 of the second resin layer 130 may vary at different points throughout the laminate 100. The non-woven textile layer 140 may have a thickness H140 of approximately 0.75 mm and may have a weight/areal density of approximately 10 GSM to 200 GSM, and in one example, about 34 GSM. In one embodiment, thickness H140 and weight/areal density of the non-woven textile layer 140 may be substantially uniform at all points throughout the laminate 100. In another embodiment, thickness H140 and weight/areal density of the non-woven textile layer 140 may vary at different points throughout the laminate 100. The backing layer 150 may have a thickness H150 of approximately 0.1 mm to 1 mm, and in one example, about 0.25 mm, and may have a weight/areal density of approximately 100 GSM to 400 GSM, and in one example, about 150 GSM. In one embodiment, thickness H150 may be substantially uniform at all points throughout the laminate 100. In another embodiment, thickness H150 may vary at different points throughout the laminate 100.

The distances from the substrate surface 1001 to the inner surfaces 111, 121, 131, 141, and 151 of each layer may be used to described the order, or layup, of the layers. For example, the distance from the inner surface 111 of the first resin layer 110 to the substrate surface 1001 is greater than the distance from the inner surface 121 of the natural fiber layer 120 to the substrate surface 1001, which is greater than the distance from the inner surface 131 of the second resin layer 130 to the substrate surface, which is greater than the distance from the inner surface 141 of the non-woven textile layer 140 to the substrate surface 1001. Among other desirable features, the embodiment of the laminate 100 illustrated in FIG. 1A and described above is substantially protected from moisture, is cuttable, is flexible, lays flat for easy installation onto a substrate with sufficiently flat and aesthetic outcomes, and allows for a range in thickness while retaining the desired benefits. For example, the embodiment of the laminate 100 illustrated in FIG. 1A may be configured to prevent an amount of moisture from contacting the natural fiber layer 120, where the amount of moisture is, for example, less than 4% by weight.

Figure 2:
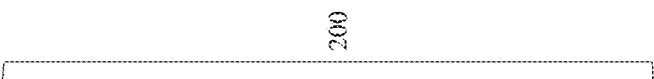
FIG. 2 illustrates a cross-sectional view of another exemplary laminate applied to a flat substrate according to one or more aspects of the disclosure.

Other embodiments comprising layers in a different order, or layup, layers with different thicknesses, layers with different weights/areal densities, and/or layers with different features, such as orientation, may provide similar benefits. For example, FIG. 2 illustrates an alternative embodiment of a laminate 200 wherein the plurality of layers includes a first resin layer 210 followed by a natural fiber layer 220, a second resin layer 230, a first non-woven textile layer 240a, a second non-woven textile layer 240b, and a backing layer 250. The first resin layer 210, the natural fiber layer 220, the second resin layer 230, and the backing layer 250 may be comprised of materials as described in relation to the corresponding layers of FIG. 1A above. The thicknesses and/or weights/areal densities of the first resin layer 210, the natural fiber layer 220, the second resin layer 230, and the backing layer 250 may be similar to those described for the first resin layer 110, the natural fiber layer 120, the second resin layer 130, and the backing layer 150 of FIG. 1A above.

The first non-woven textile layer 240a and second non-woven textile layer 240b may be one of a number of types and may be comprised of materials as described in relation to the non-woven textile layer 140 of FIG. 1A above, and the first non-woven textile layer 240a and second non-woven textile layer 240b may be comprised of polyester or any of the materials described above in relation to FIG. 1A. The first non-woven textile layer 240a may have a thickness H240a similar to thickness H140 described in relation to FIG. 1A above and may have a weight/areal density similar to the weight/areal density described for the non-woven textile layer 140 of FIG. 1A above. In one example, the first non-woven textile layer 240a may have a weight/areal density of about 34 GSM. Similarly, the second non-woven textile layer 240b may have a thickness H240b similar to thickness H140 described in relation to FIG. 1A above and may have a weight/areal density similar to the weight/areal density described for the non-woven textile layer 140 of FIG. 1A above. In one example, the second non-woven textile layer 240b may have a weight/areal density of about 34 GSM.

In some embodiments, such as the one shown in FIG. 2, the backing layer 250 may be the innermost layer from the substrate 2000. The backing layer 250 may have an inner surface 251 configured to be applied to and abut a substrate surface 2001. The backing layer 250 may also have an outer surface 252. Similar to the embodiment illustrated in FIG. 1A, the embodiment of the laminate 200 illustrated in FIG. 2 may advantageously allow for an outer surface 212 of the first resin layer 210 (i.e., the outermost layer from the substrate 2000) to be at a distance H200 that is substantially uniform at substantially all points along the substrate surface 2001. In this way, the outer surface 212 of the first resin layer 210 substantially resembles the shape of the substrate surface 2001.

In yet another example, the laminate 200 may optionally include a top coat (not shown in FIG. 2) on top of the first resin layer 210 such that the top coat is the outermost layer from the substrate 2000. In one example of such an embodiment, the top coat may be comprised of UV polyethylene terephthalate (UV PET) and may have a thickness of about 3 mils, the first resin layer 210 may be comprised of polylactic acid (PLA) and may have a thickness of about 12 mils, the natural fiber layer 220 may be comprised of flaxtape and may have a weight/areal density of approximately 105 GSM and may be in the range of 50 GSM to 200 GSM, the second resin layer 230 may be comprised of poly(methyl methacrylate) (PMMA) or other known resins or as discussed herein, and may have a thickness of about 4.5 mils, the first non-woven textile layer 240a may be comprised of polyester and may have a weight/areal density of about 34 GSM, the second non-woven textile layer 240b may be comprised of polyester and may have a weight/areal density of about 34 GSM, and the backing layer 250 may be comprised of backing paper and may have a thickness of about 10 mils. The embodiment of the laminate 200 illustrated in FIG. 2 may provide additional benefits, such as moisture resistance, while remaining flexible and cuttable. It is also contemplated that other orders of layers, other materials and other thicknesses discussed herein can be used to form the example laminate layers in this example for optimization of the laminate.

Figure 3:
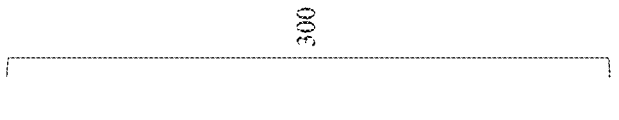
FIG. 3 illustrates a cross-sectional view of another exemplary laminate applied to a flat substrate according to one or more aspects of the disclosure.
Figure 3:
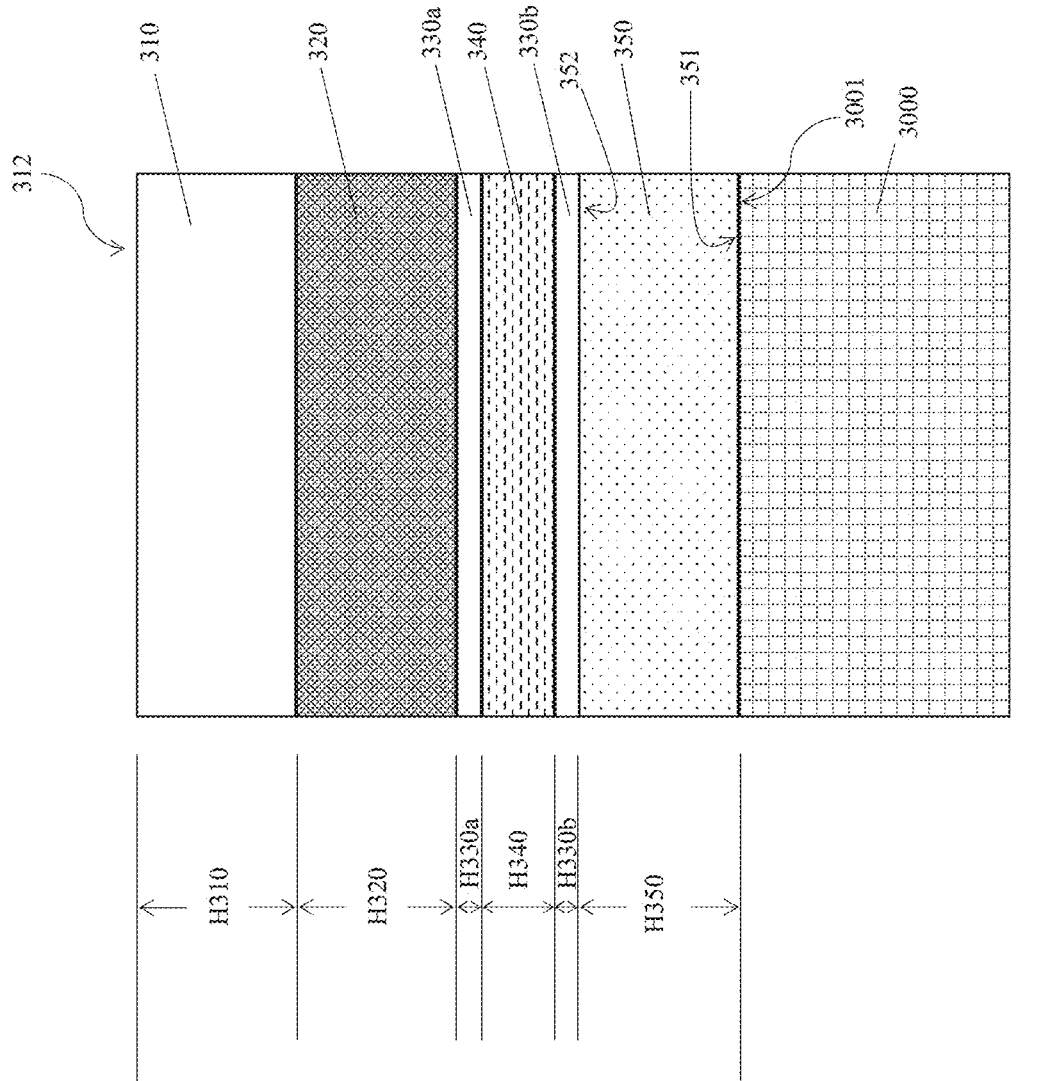

FIG. 3 illustrates another alternative embodiment of a laminate 300 wherein the plurality of layers includes a first resin layer 310 followed by a natural fiber layer 320, a second resin layer 330a, a non-woven textile layer 340, a third resin layer 330b, and a backing layer 350. The first resin layer 310, the natural fiber layer 320, the non-woven textile layer 340, and the backing layer 350 may be comprised of materials as described in relation to the corresponding layers of FIG. 1A above. The thicknesses and/or weights/areal densities of the first resin layer 310, the natural fiber layer 320, the non-woven textile layer 340, and the backing layer 350 may be similar to those described for the first resin layer 110, the natural fiber layer 120, the non-woven textile layer 140, and the backing layer 150 of FIG. 1A above. The second resin layer 330a and third resin layer 330b may be comprised of materials as described in relation to the second resin layer 130 of FIG. 1A above, and the second resin layer 330a and third resin layer 330b may be comprised of polylactic acid (PLA) or other resins discussed herein. The second resin layer 330a may have a thickness H330a similar to thickness H130 described in relation to FIG. 1A above. Similarly, the third resin layer 330b may have a thickness H330b similar to thickness H130 described in relation to FIG. 1A above.

In some embodiments, such as the one shown in FIG. 3, the backing layer 350 may be the innermost layer from the substrate 3000. The backing layer 350 may have an inner surface 351 configured to be applied to and abut the substrate surface 3001. The backing layer 350 may also have an outer surface 352. Similar to the embodiment illustrated in FIG. 1A, the example laminate 300 illustrated in FIG. 3 may advantageously allow for an outer surface 312 of the first resin layer 310 (i.e., the outermost layer from the substrate 3000) to be at a distance H300 that is substantially uniform at substantially all points along the substrate surface 3001 such that the outer surface 312 of the first resin layer 310 substantially resembles the shape of the substrate surface 3001, which can be flat. The embodiment of the laminate 300 illustrated in FIG. 3 may provide additional benefits similar to the laminates described above, such as moisture resistance, while remaining flexible and cuttable. In an alternative variation of the example discussed in relation to FIG. 3, a top coat comprised of UV polyethylene terephthalate (UV PET) (not shown in FIG. 3) may be included on top of the first resin layer 310 such that the top coat is the outermost layer from the substrate 3000.

Figure 4:
FIG. 4 illustrates a cross-sectional view of another exemplary laminate applied to a flat substrate according to one or more aspects of the disclosure.

FIG. 4 illustrates yet another alternative embodiment of a laminate 400 wherein the plurality of layers includes a first resin layer 410 followed by a natural fiber layer 420, a backing layer 450, a second resin layer 430, and a non-woven textile layer 440. The first resin layer 410, the natural fiber layer 420, the backing layer 450, the second resin layer 430, and the non-woven textile layer 440 may be comprised of materials as described in relation to the corresponding layers of FIG. 1A above, and the non-woven textile layer 440 of the embodiment illustrated in FIG. 4 may be comprised of cotton or other materials as discussed herein. The thicknesses and/or weights/areal densities of the first resin layer 410, the natural fiber layer 420, the backing layer 450, and the non-woven textile layer 440 may be similar to those described for the first resin layer 110, the natural fiber layer 120, the backing layer 150, and the non-woven textile layer 140 of FIG. 1A above, and the first resin layer 410 may have a thickness of about 9 mils, the natural fiber layer 420 may have a weight/areal density of about 130 GSM, and the non-woven textile layer 440 may have a weight/areal density of about 150 GSM. The second resin layer 430 may have a thickness H430 of approximately 6-12 mils, and in one example, about 9 mils. In one embodiment, thickness H430 of the second resin layer 430 may be substantially uniform at all points throughout the laminate 400. In another embodiment, thickness H430 of the second resin layer 430 may vary at different points throughout the laminate 400.

In some embodiments, such as the one shown in FIG. 4, the non-woven textile layer 440 may be the innermost layer from the substrate 4000. The non-woven textile layer 440 may have an inner surface 441 configured to be applied to and abut the substrate surface 4001. The non-woven textile layer 440 may also have an outer surface 442. Similar to the embodiment illustrated in FIG. 1A, the embodiment of the laminate 400 illustrated in FIG. 4 may advantageously allow for an outer surface 412 of the first resin layer 410 (i.e., the outermost layer from the substrate 4000) to be at a distance H400 that is substantially uniform at substantially all points along the substrate surface 4001. The embodiment of the laminate 400 illustrated in FIG. 4 may provide additional benefits similar to the laminates described above.

Figure 5:
FIG. 5 illustrates a cross-sectional view of another exemplary laminate applied to a flat substrate according to one or more aspects of the disclosure.

FIG. 5 illustrates another alternative embodiment of a laminate 500 that does not include a non-woven textile layer yet still provides benefits associated with the previously described embodiments. The laminate 500 may have a total thickness of approximately 1.3 mm to 3 mm. As illustrated in FIG. 5, the plurality of layers includes a first resin layer 510 followed by a natural fiber layer 520, a backing layer 550, a second resin layer 530, and a cork layer 560. The first resin layer 510, the natural fiber layer 520, the backing layer 550, and the second resin layer 530 may be comprised of materials as described in relation to the corresponding layers of FIG. 1A above. The thicknesses and/or weights/areal densities of the first resin layer 510, the natural fiber layer 520, the backing layer 550, and the second resin layer 530 may be similar to those described for the first resin layer 110, the natural fiber layer 120, the backing layer 150, and the second resin layer 130 of FIG. 1A above, and the first resin layer 510 may have a thickness of about 9 mils and the second resin layer 530 may have a thickness of about 3 mils. The cork layer 560 may be comprised substantially from cork rollstock. The cork layer 560 may have a thickness H560 of approximately 1 mm to 3.5 mm, and in one example, about 3 mm. In one embodiment, thickness H560 of the cork layer 560 may be substantially uniform at all points throughout the laminate 500. In another embodiment, thickness H560 of the cork layer 560 may vary at different points throughout the laminate 500.

In some embodiments, such as the one shown in FIG. 5, the cork layer 560 may be the innermost layer from the substrate 5000. The cork layer 560 may have an inner surface 561 configured to be applied to and abut the substrate surface 5001. The cork layer 560 may also have an outer surface 562. Similar to the embodiment illustrated in FIG. 1A, the embodiment of the laminate 500 illustrated in FIG. 5 may advantageously allow for an outer surface 512 of the first resin layer 510 (i.e., the outermost layer from the substrate 5000) to be at a distance H500 that is substantially uniform at substantially all points along the substrate surface 5001. The embodiment of the laminate 500 illustrated in FIG. 5 may provide additional benefits, such as moisture resistance, while remaining flexible and cuttable.

Figure 6:
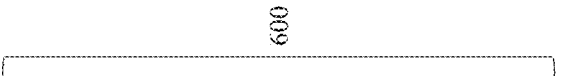
FIG. 6 illustrates a cross-sectional view of another exemplary laminate applied to a flat substrate according to one or more aspects of the disclosure.
Figure 6:
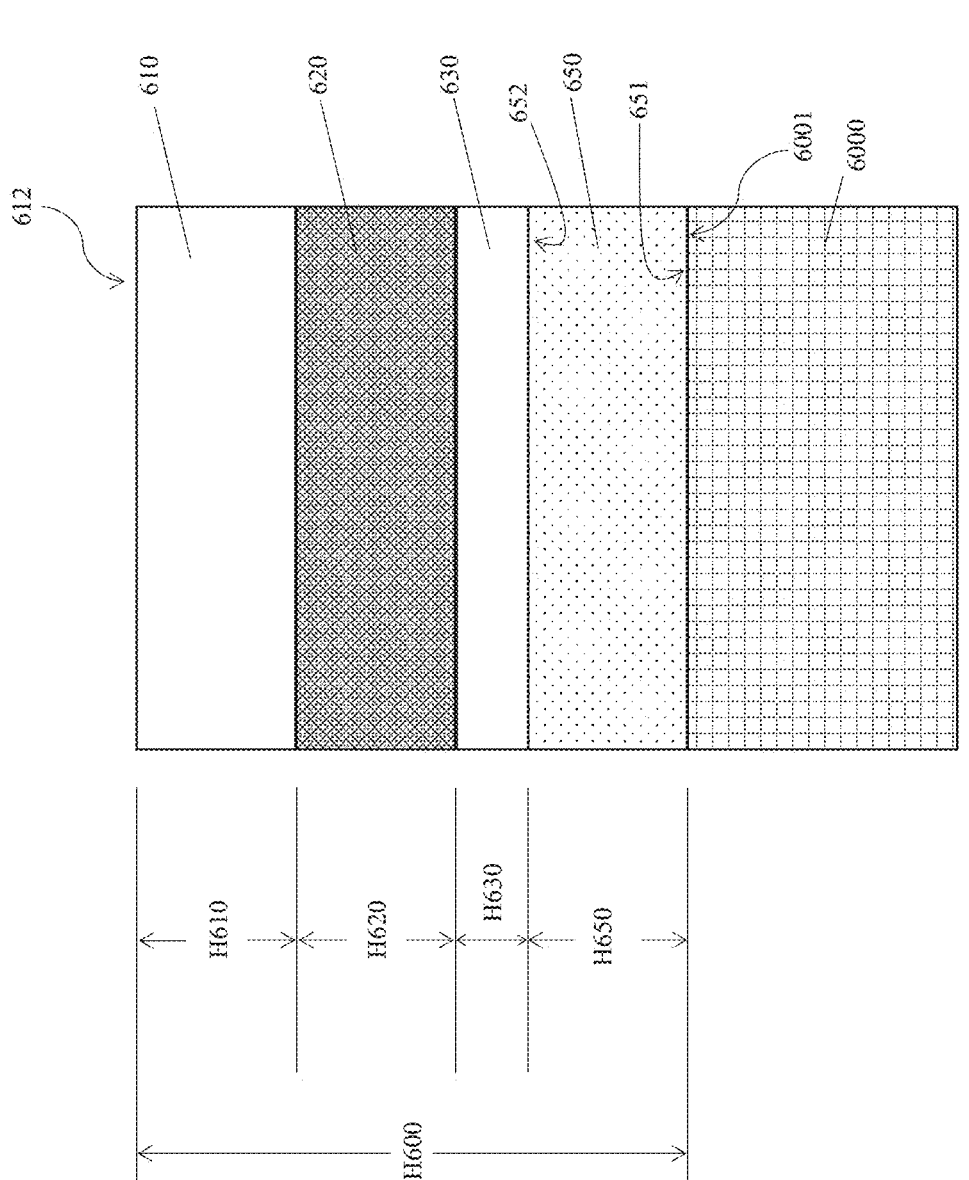

FIG. 6 illustrates another alternative embodiment of a laminate 600 that also does not include a non-woven textile layer yet still provides benefits associated with the previously described embodiments. As illustrated in FIG. 6 the laminate 600 includes a first resin layer 610 followed by a natural fiber layer 620, a second resin layer 630, and a backing layer 650. The first resin layer 610, the natural fiber layer 620, the second resin layer 630, and the backing layer 650 may be comprised of materials as described in relation to the corresponding layers of FIG. 1A above. The thicknesses and/or weights/areal densities of the first resin layer 610, the natural fiber layer 620, the second resin layer 630, and the backing layer 650 may be similar to those described for the first resin layer 110, the natural fiber layer 120, the second resin layer 130, and the backing layer 150 of FIG. 1A above.

In one particular example, the first resin layer 610 may be comprised of polylactic acid (PLA) and may have a thickness of about 10 mils, the natural fiber layer 620 may be comprised of flax and may have a weight/areal density of between about 50-200 GSM and in one particular example, can be approximately 105 GSM, the second resin layer 630 may be comprised of poly(methyl methacrylate) (PMMA) and may have a thickness of about 4.5 mils, and the backing layer 650 may be comprised of backing paper and may have a thickness of about 10 mils.

In another particular example, the first resin layer 610 may be comprised of polylactic acid (PLA) and may have a thickness of about 10 mils, the natural fiber layer 620 may be comprised of flaxtape and may have a weight/areal density of between about 50-200 GSM and in one particular example, can be approximately 105 GSM, the second resin layer 630 may be comprised of polylactic acid (PLA) and may have a thickness of about 1.5 mils, and the backing layer 650 may be comprised of backing paper and may have a thickness of about 10 mils. This example, is referenced as Eka® TP1.3 (MPO015B).

In some embodiments, such as the one shown in FIG. 6, the backing layer 650 may be the innermost layer from the substrate 6000. The backing layer 650 may have an inner surface 651 configured to be applied to and abut the substrate surface 6001. The backing layer 650 may also have an outer surface 652. Similar to the embodiment illustrated in FIG. 1A, the embodiment of the laminate 600 illustrated in FIG. 6 may advantageously allow for an outer surface 612 of the first resin layer 610 (i.e., the outermost layer from the substrate 6000) to be at a distance H600 that is substantially uniform at substantially all points along the substrate surface 6001. The embodiment of the laminate 600 illustrated in FIG. 6 may provide additional benefits, such as moisture resistance, while remaining flexible and cuttable.

The use of a laminate according to one or more aspects of this disclosure may be detected a number of ways. Exemplary methods of detection may include, for example, microscopy cross-sectional inspection, burn test inspection for plastics identification, manual delamination, and/or product compliance with certain specifications, such as specifications related to composition, flatness, moisture resistance, and aesthetics.

As is discussed herein, a laminate, such as laminate 100, can include five layers of four different types of materials, which may include fiber for reinforcement, a resin (matrix), a nonwoven layer, and backing layer. In this example, each layer can have particular use on its own and/or in tandem or combination with the other layers. In one example, the fiber layer and backing layer may produce an aesthetic. The backing layer may assist in adhesion for use in for example a veneer product. The resin layer may hold the composite together and may protect the fiber during lamination. Also, the resin together with the reinforcement layers (fiber and nonwoven) may help in creating a flat laminate. The non-woven layer can be an optional layer, which can be used when perfect flatness, or other properties are desired. Several alterations can be made to the resin matrix or application of an additional layer to optimize for various properties. In exemplary laminates with a nonwoven layer, the nonwoven can be used to dramatically change optical and mechanical properties of the laminate. The examples discussed herein maintain a high bio-based content in the laminate while meeting certain performance criteria. In certain examples, by using various inputs and combinations thereof, certain layups with high bio-based content, for example 60-97% of bio-based content, achieve a mechanical utility and a high degree of flatness.

In one example, the laminates discussed herein can have a desired aesthetic of being nearly indistinguishable from a wood veneer. Such aesthetic qualities can come from the natural fiber and backing material. Variations in the input natural fiber (such as areal weight, weave, stitching, bleaching, etc.) can change the aesthetic. In one example, natural unidirectional natural fibers, with an areal weight of 50-200 gsm, laminated over a solid color backing material, may provide an aesthetic, which is nearly indistinguishable from a wood veneer. In one example, the layup can include a natural fiber closer to the surface of the lamination, with the backing material underneath to provide a background color.

In one example, the laminates discussed herein a polymer resin, or "matrix", may be used to hold the composite together and protect it from environmental factors. In one example, as discussed herein a PLA may be used as the matrix because it is a widely available, relatively rigid, hard, and a cost effective bioplastic (99.9% bio-based). Also the melting point of PLA is within the range of processing parameters of natural fibers. Natural fibers begin to darken and weaken mechanically when above 300 degrees F. for extended periods of time. Processing any longer than 1 minute at 420 degrees F. may lead to significant darkening. PLA is also a low/zero VOC resin. As such the PLA resin layer melting point is low enough to prevent the natural fibers from degrading.

In one example, a layup of 4 layers in the following order may include: a resin layer, a fiber layer of 110 gsm, a resin layer, and a backing layer or in the following order: resin, fiber (110 gsm), backing, and resin. The above two examples as discussed herein may help to achieve a desired aesthetic that can mimic a wood veneer, for example. In the example of having a resin layer, a fiber layer of 110 gsm, a resin layer, and a backing layer as discussed herein, provides an exemplary layup where the backing layer also acts as a surface that can be easily adhered to standard wall substrates such as gypsum board, drywall, plywood, MDF, OSB, acrylic and other common substrates using common adhesives, such as PVA glues, Epoxies, Reactive poly urethanes (PUR), acrylics, and other common adhesives.

In one example, a "dry" (not impregnated with the matrix resin) backing layer may be used to allow common adhesives to work with the product in installation. In one example, enough impregnation, for example, less than 40%, is needed to adhere the backing material to the layup, but not too much so that the matrix resin bleeds through to the backside and limits adhesive compatibility. For example, the backing layer comprises a first surface and a second surface and the backing layer can be configured to prevent resin from bleeding through the second surface, while utilizing the adhesive to attach the first surface to the layup or the second layer of resin.

In certain examples, without the second layer of resin on the side of the fiber layer closest to the backing, the backing may not become properly laminated and may lose its water resistance and utility. Additionally, in certain examples, the second layer of resin on the side of the fiber layer closest to the backing balances the top layer of resin and helps to prevent the laminate from the excessively curling into a U shape or curl on the inside diameter, which may in certain instances not be usable as a veneer product. In other words, the second layer of resin is configured to maintain the laminate or the plurality of layers in a substantially flat configuration.

In some examples, natural fibers can be susceptible to deterioration when exposed to one or more of chemicals, heat, and UV rays. In the case of a veneer, most chemical and physical assault would occur on the "show side" surface or the surface that is visible or faces the user. As such, the show surface resin layer may be configured to act as a protective layer. To achieve protection, the resin layer can be of an adequate thickness. PLA resins come in different orientations. For example, a biaxial orientation (BOPLA) for thinner applications 3 mil or thinner, or non oriented PLA for thicker applications, e.g., 9 mil or thicker. In one example, for the "show surface" layer a 9 mil or thicker PLA may be used to achieve adequate protection, and can be a non-oriented PLA. In the case of the second layer of resin on the side of the fiber layer, a PLA can be used such that the resin adequately wets out the backside of the fibers without penetrating through the paper layer. And in one example, thinner 1.5-3 mil BOPLA may be used for the second layer of resin. In another example, the laminate can be PLA (10 mil), fiber (110 gsm), PLA (1.5 mil), and a backing layer.

Using a thicker 10 mil. resin may also have an additional protective benefit during manufacturing. During processing, processing belts can become very hot, for example, 340-465 degrees F. And the thicker layers surrounding the natural fibers protect the natural fibers from the heat of the belts ensuring the fibers do not overly darken or degrade.

Certain laminates may have a small amount of edge curl towards the show surface forming a U shape. In traditional veneer applications, a small amount of curl is acceptable as the adhesive effectively holds down the veneer to the substrate. But in certain applications where this is unacceptable, certain alterations to the layup can be made. One such option for preventing the curl is to add additional reinforcement layers. During the cooling phase of processing the matrix resin layer(s) shrink slightly. Since the resin is impregnated into the fibers, this shrinking produces a force that causes curl in the final layup. As a general rule, more resin creates more curling force. This can lead to resin on the top surface of a reinforcement layer producing a force that curls the final laminate into a U shape (curl on the inner diameter), and a resin on the bottom surface producing the opposite effect of curling the final laminate into a upside down U (curl on the outer diameter). In some examples, curl on the outer diameter is generally seen as more desirable. The source of curl is the interaction between matrix and reinforcement. So adding additional reinforcement and matrix layers below the fiber layer can influence the curl to create a flat product. In certain examples, a nonwoven layer can be used because of its low areal weight and permeability to promote this matrix/reinforcement interaction. One example layup can be a PLA layer (10 mil), a fiber layer (110 gsm), a PLA layer (1.5 mil), a nonwoven layer (34 gsm), a PLA layer (1.5 mil), and a backing layer.

In the above example, using a show surface side resin during the lamination process with high pressure can completely impregnate the fibers and achieve balance. But in certain examples, the natural fibers may absorb more than 50% of the available resin during impregnation leaving an insufficient amount of excess resin to protect the fibers from water and chemical attacks. Thus, in some examples, the layer of BOPLA can be used to provide excess resin for protection and to prevent excess outflow of the show surface PLA through the composite.

In the above examples, the nonwoven layer can provide many different functions. In certain examples, it can absorb excess resin, and stabilize the flatness of the layup. Also in certain examples, a balanced layup, e.g, including an equal number of resin layers, for example of 10 mil PLA, on each side may produce a balanced layup. Yet this may not hold true in certain cases, as the complexity with having more matrix reinforcement interactions of the layup and processing conditions (high temperature low, high run speed, low pressure) increases. In certain examples, proper lamination and balance may be achieved utilizing high pressure (>100 PSI) and a large amount of resin (>10 mil) only on the topside, for example. This is possible in certain cases, however, the resin left on the surface does not effectively resist water or chemical attack.

As discussed, laminates according to one or more aspects of this disclosure exhibit advantageous qualities, including, for example, moisture resistance and stain resistance. The resistance-related qualities of certain laminates according to one or more aspects of this disclosure, including, moisture resistance and stain resistance, are surprising, including in view of the biomaterials used in the laminates. Further, it was found that the asymmetric layup of certain laminates according to one or more aspects of this disclosure, i.e., a layup with layers of differing thicknesses (e.g., a laminate comprising a first resin layer and a second resin layer that is thinner than the first resin layer), was important for stain and moisture resistance-related qualities.

Moisture-related, stain-related, and other tests were conducted on exemplary embodiments of laminates according to one or more aspects of this disclosure. The procedure for one test was conducted in accordance with the W-102 (2019), WA Quality Standard for Wallcovering/Alternative Constructions, which is incorporated herein fully by reference. The sample tested was a sample of Eka® wallcovering manufactured by Lingrove. Unless otherwise specified, the flame spread and the smoke development testing was conducted on ¼-in. (6.3 mm) fiber-cemented board or equivalent. Materials that meet the requirements of NFPA 286 were exempt. The physical test requirements are illustrated in Table 1 below. The results of the test are illustrated in Table 2 below.

TABLE 1

| Physical Tests | Type I Light Duty | Type II Medium Duty | Type III Heavy Duty |
|---|---|---|---|
| Total Wt., $oz/yd^2$ (min) ($Kg/m^2$) | (Note 1) | (Note 1) | (Note 1) |
| PVC Coated Wallcovering | 7.0 (0.237) | 13.0 (0.442) | 22.0 (0.748) |
| Polyolefin Coated Wallcovering | 5.5 (0.186) | 10.0 (0.340) | 17.0 (0.578) |
| Breaking Strength, lbf (Newtons) (min) | | | |
| Machine Direction | 30 (133) | 50 (222) | 95 (423) |
| Cross Machine Direction | 30 (133) | 50 (222) | 95 (423) |
| Tearing Strength, Scale Reading (min) | | | |
| Machine Direction | 12 | 25 | 50 |
| Cross Machine Direction | 12 | 25 | 50 |
| Coating Adhesion, lbf for 1" width (Newtons for 2.5 cm width) | 2 (8.9) | 3 (13.35) | 3 (13.35) |
| Colorfastness to Light | 200 | 200 | 200 |
| Blocking, scale rating (max) | 2 | 2 | 2 |
| Crocking, scale rating (min) | Good | Good | Good |
| Cold Crack Resistance, −20° F. | No Change | No Change | No Change |
| Heating Aging, 7 days at 158° F. | (Note 2) | (Note 2) | (Note 2) |
| Shrinkage, % (max) | | | |
| Machine Direction | 2 | 2 | 2 |
| Cross Machine Direction | 1 | 1 | 1.5 |
| Stain Resistance, Reagents | 1-9 (Note 3) | 1-12 (Note 3) | 1-12 (Note 3) |
| Washability, cycles (min) | 100 | 100 | 100 |
| Scrubbability, cycles (min) | 200 | 300 | 500 |

(Note 1):
Total weight of the specimen is not classifiable. PVC Coated and Polyolefin Coated Wallcoverings are the only physical constructions referenced in W-102 standard requirement for total weight.
(Note 2):
The specimen shall not become stiff, brittle, discolored, or show loss of grain.
(Note 3):
Stain Resistance Regent (1) 75° F. distilled water
(2) 120° F. distilled water
(3) 50% ethyl alcohol
(4) vinegar (3% acetic acid)
(5) 1% NaOH solution
(6) 5% HCl
(7) standard soap solution
(8) detergent solution
(9) orange juice
(10) butter
(11) catsup
(12) tea

TABLE 2

| Physical Tests | Test Data | Test Result |
| --- | --- | --- |
| Total Wt., oz/yd$^2$ (Kg/m$^2$) (min) | | |
| ekoa ® - Flax | 19.90 (0.675) (Note 4) | Unclassifiable |
| Breaking Strength, lbf (Newtons) (min) | | |
| Machine Direction | 721 (3207.1) | Type III. Heavy Duty |
| Cross Machine Direction | 170 (755.3) | Type III. Heavy Duty |
| Tearing Strength, Scale Reading | | |
| Machine Direction | 25.6 | Unclassifiable |
| Cross Machine Direction | (Note 5) | |
| Coating Adhesion, lbf for 1" width | | |
| Machine Direction | (Note 6) | Not Applicable |
| Cross Machine Direction | | |
| Colorfastness to Light (200 hours) | Poor (Note 7) | Unclassifiable |
| Blocking, scale rating (max) | 2 | Type III. Heavy Duty |
| Crocking, scale rating (min) | Good | Type III. Heavy Duty |
| Cold Crack Resistance, −20° F. | | |
| Machine Direction | Pass | Unclassifiable |
| Cross Machine Direction | Cracked (Note 8) | |
| Heating Aging, 7 days at 158° F. | No Change | Type III. Heavy Duty |
| Shrinkage, % (max) | | |
| Machine Direction | −0.106% | Type III. Heavy Duty |
| Cross Machine Direction | −0.536% | Type III. Heavy Duty |
| Stain Resistance | 1-12 (Note 9) | Type III. Heavy Duty |
| Washability, cycles (min) | Pass (100) | Type III. Heavy Duty |
| Scrubbability, cycles (min) | Pass (500) | Type III. Heavy Duty |
| Flame Spread Index | 65 | Class B |
| Smoke Developed Index | 10 | Class A |

(Note 4):
Total weight of the specimen is not classifiable. PVC Coated and Polyolefin Coated Wallcoverings are the only physical constructions referenced in W-102 standard requirement for total weight.
(Note 5):
Readings are rejected where tearing of specimen deviated >10 mm from initial slit. Ref. ASTM D751 Section 3.5. Machine direction alone could be classified as Type II.
(Note 6):
Coating adhesion is not applicable to wallcovering from which a coating cannot be separated. Ref. CCC-W-408D
(Note 7):
Shall be no change in color or shade, discoloration, exudation, development or tackiness or stiffness after 200 hours of exposure. Ref. Federal Test Standard 191-Method 5660
(Note 8):
The specimen must not have cracked in testing. Ref. CCC-W-408D
(Note 9):
Stain Resistance

| Regent | Rating |
| --- | --- |
| (1) 75° F. distilled water | 5 |
| (2) 120° F. distilled water | 5 |
| (3) 50% ethyl alcohol | 5 |
| (4) vinegar | 5 |
| (5) 1% NaOH solution | 5 |
| (6) 5% HCl | 5 |
| (7) standard soap solution | 5 |
| (8) detergent solution | 5 |
| (9) orange juice | 5 |
| (10) butter | 5 |
| (11) catsup | 5 |
| (12) tea | 5 |

The rating system is based on the AATCC Nomenclature for Subjective Rating Processes in which a rating of 5 = negligible or no staining, 4 = slight staining, 3 = noticeable staining, 2 = considerable staining, and 1 = severe staining. A rating of less than 4 is considered "appreciable" in relation to severity of change.

The results above in relation to the W102 standard were achieved without the assistance of urethane, olefin or PVC coatings. Such coatings may be harmful to the environment (high VOC, oil based) and are typically needed to pass stain, abrasion resistance testing in the W102 standard for wall-coverings. As such, it is unexpected to meet W102 standards without urethane, olefin or PVC coatings.

Figure 7:
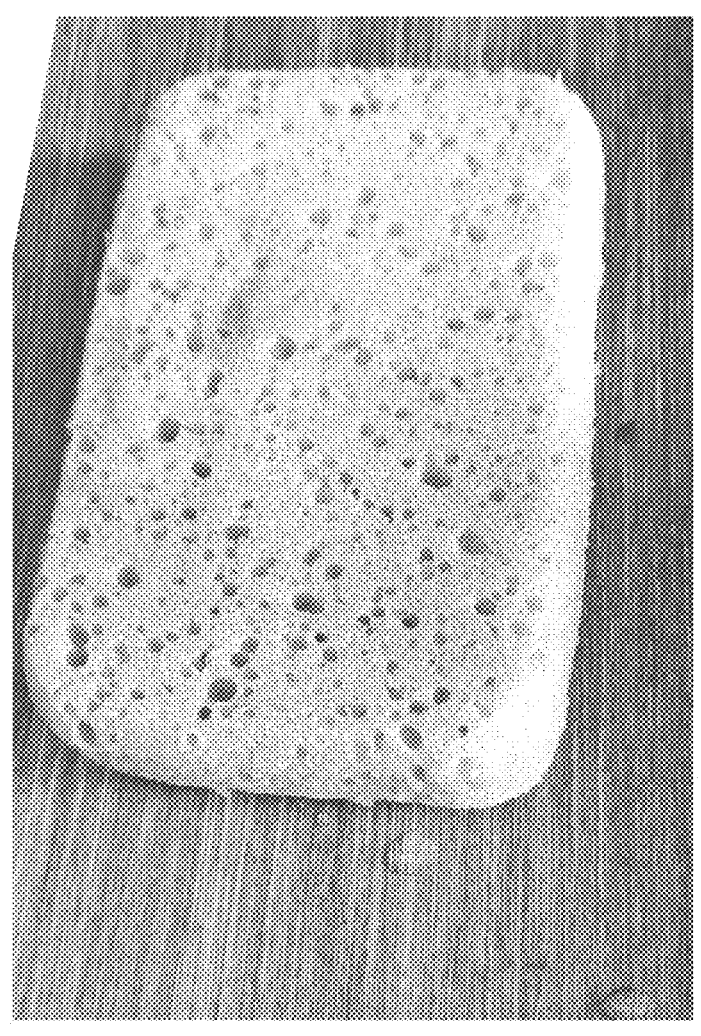
FIG. 7 illustrates a perspective view of a sample and sponge used in a moisture-related test conducted in accordance with one or more aspects of the disclosure.
Figure 8:
FIG. 8 illustrates a perspective view of a sample used in a moisture-related test conducted in accordance with one or more aspects of the disclosure.
Figure 9:
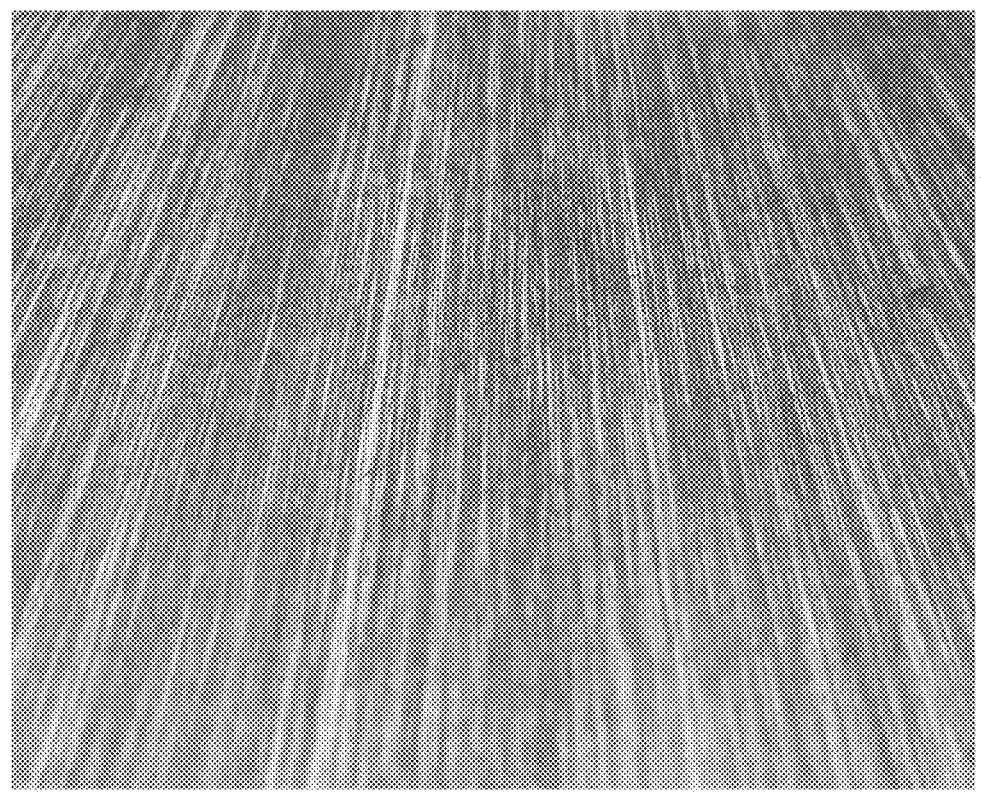
FIG. 9 illustrates a perspective view of a sample used in a moisture-related test conducted in accordance with one or more aspects of the disclosure.
Figure 10:
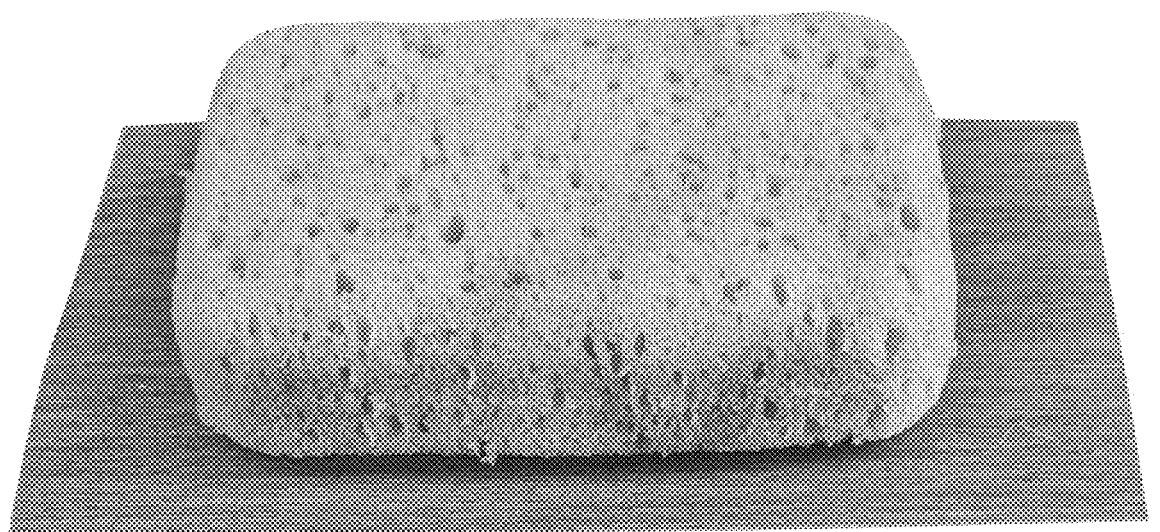
FIG. 10 illustrates a perspective view of a sample and sponge used in a moisture-related test conducted in accordance with one or more aspects of the disclosure.
Figure 11:
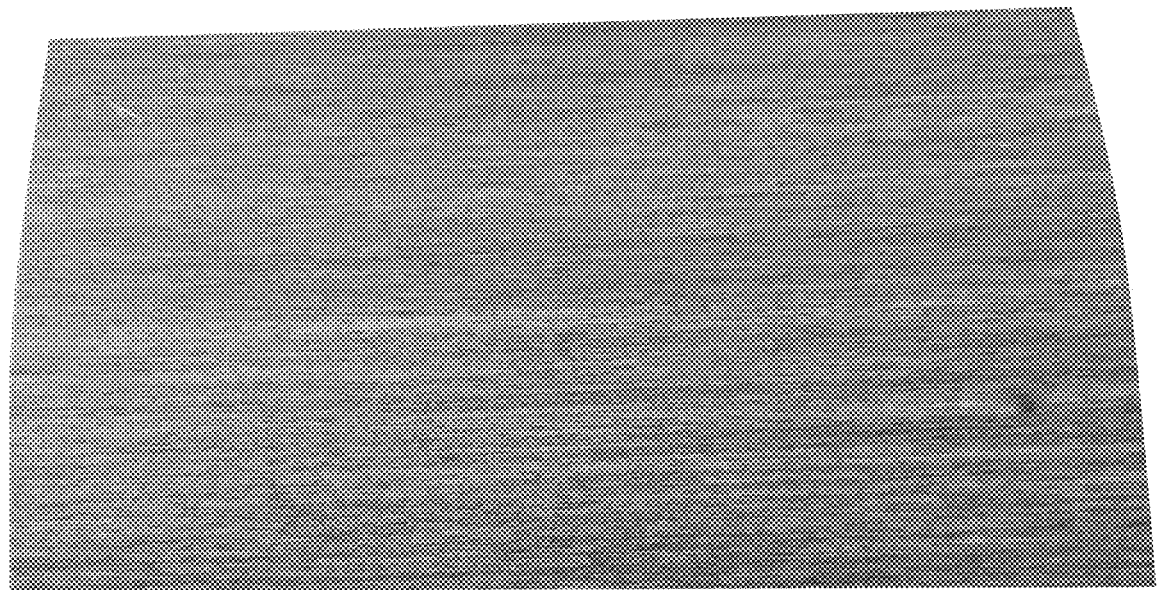
FIG. 11 illustrates a perspective view of a sample used in a moisture-related test conducted in accordance with one or more aspects of the disclosure.

Another moisture-related test was conducted using a wet sponge with two samples or test pieces. The testing was conducted in accordance with Tech Labo INS 18 Indice 4, which is incorporated herein fully by reference. The procedure for the test was as follows: A sponge was soaked in water (160 gr+/−5%) using a graduated beaker filled with 150 mL of water. The sponge was laid over the test pieces or samples. The sponge was left in position for 24 hours. The sponge was removed, and the test pieces were left to air dry for 24 hours. After the test pieces were allowed to air dry for 24 hours, a visual inspection was performed, and the portion of the samples in contact with the wet sponge was rated 1-5, where 5=No change, 4=Slight absorption, 3=Heavy Staining/Absorption, 2=Slight delamination and swelling, and 1=Complete delamination and failure. A rating of 4 or higher is needed to pass. The sample pieces included two pieces of Ekoa® manufactured by Lingrove: Ekoa® TP1.3 coated with Larmar Softouch PET Film (PO058C) and Ekoa® TP1.3 (MPO015B). The results are illustrated in Table 3 below. FIG. 7 illustrates the MPO015B sample and sponge during the contact sponge test. FIG. 8 illustrates the MPO015B sample after the sponge was removed. FIG. 9 illustrates the MPO015B sample after the 24-hour drying period. FIG. 10 illustrates the PO058C sample and sponge during the contact sponge test. FIG. 11 illustrates the PO058C sample after the 24-hour drying period. The Ekoa® TP1.3 formulation met the specification for the contact sponge test; it did have shininess where the water evaporated after the test completed. It should be noted that the initial curvature of the sample was convex with the show surface curling away from the tray. Within 10 minutes of the sponge being placed on the sample, the curl switched to concave. This may denote deeper water penetration and adverse effects not accounted for in the testing protocol. The addition of Larmar as the top coat to the Ekoa® TP1.3 family significantly increases water resistance in the contact sponge test. There was no change in the surface, and it was rated a 5 and thus passed the contact sponge test.

TABLE 3

| Sample | Observation |
| --- | --- |
| PO058C (TP1.3 + Larmar) | No change, 5 |
| MPO015B | Slight Staining, 4 |

Figure 12:
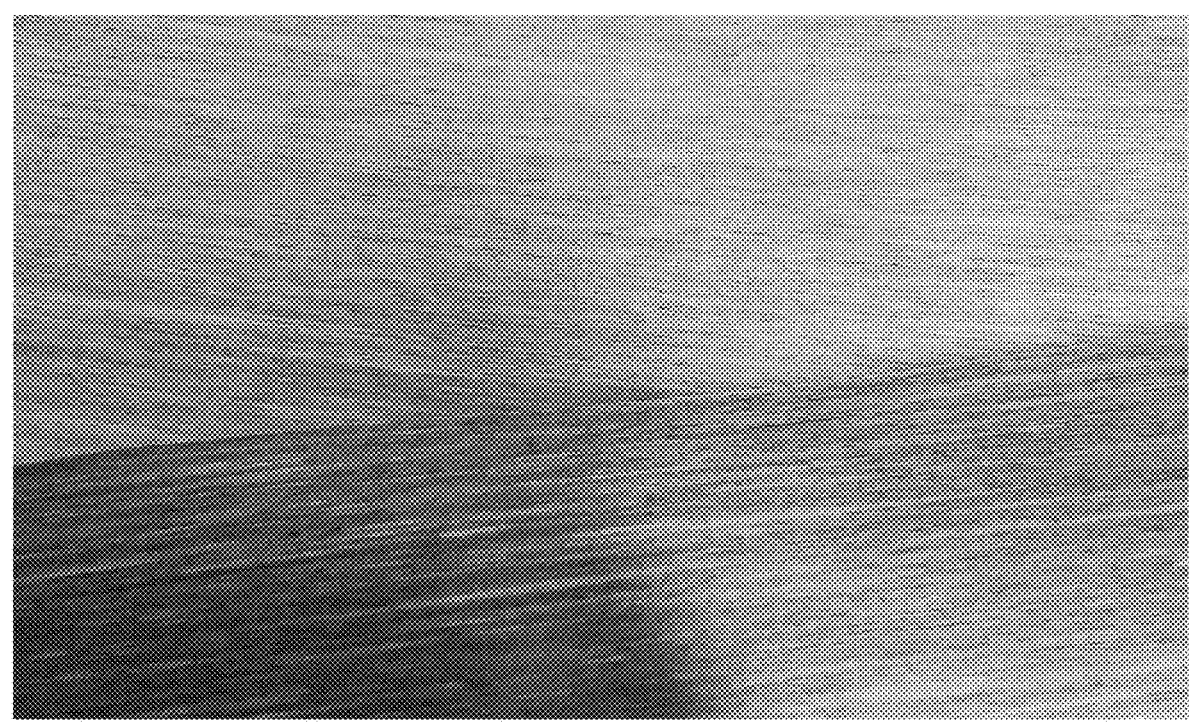
FIG. 12 illustrates a perspective view of a sample used in a test conducted in accordance with one or more aspects of the disclosure.
Figure 13:
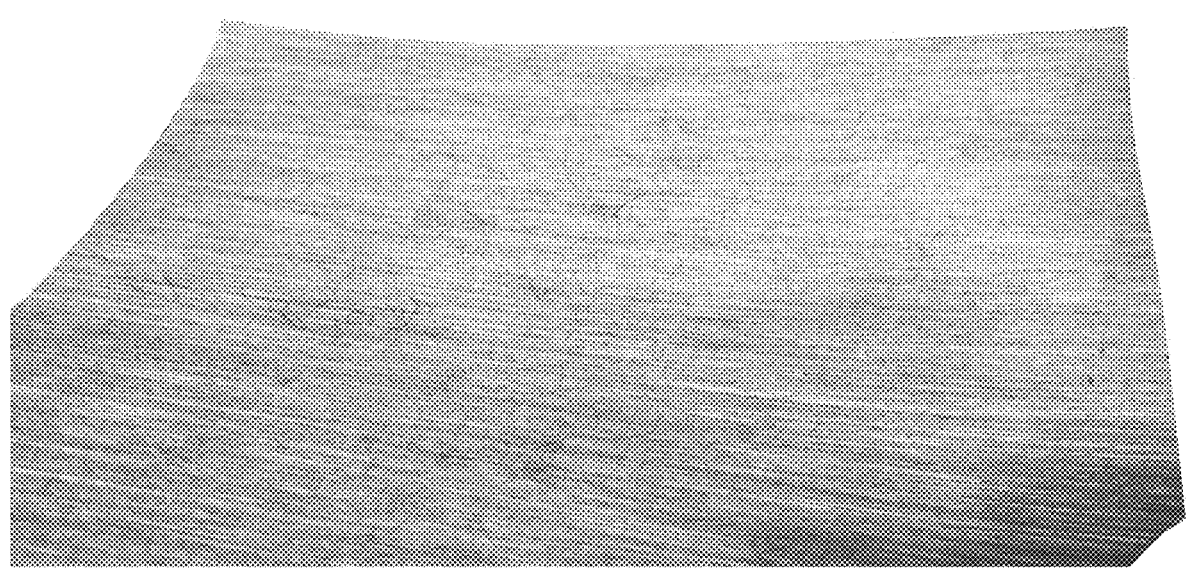
FIG. 13 illustrates a perspective view of a sample used in a test conducted in accordance with one or more aspects of the disclosure.

Another test was conducted in accordance with the ANSI/KCMA A161.1-2022 "Performance and Construction Standard for Kitchen and Vanity Cabinets" standard, which is incorporated herein fully by reference. The samples tested were two duplicate specimens of veneer Ekoa® TP1.3 (MPO015B) manufactured by Lingrove. The procedure for the test was as follows: Section 9.2 Shrinkage and Heat Resistance: Specimens were placed in an environmental chamber at 49° C.±3° C. and 70%±5% humidity for 24 hours, then were removed and allowed to return to room temperature and humidity. Section 9.3 Hot and Cold Check Resistance: A cycle consisted of placing the specimens in an environmental chamber at 49° C.±3° C. and 70%±5% humidity for one hour. The chamber then returns to room temperature and humidity for ½ hour, followed by a decrease to −21° C.±3° C. for one hour. Finally, the chamber again returns to room temperature and humidity conditions. This constitutes one (1) cycle and is repeated for a total of five (5) cycles. Section 9.4 Chemical Resistance: Each specimen was tested using vinegar, lemon juice, orange juice, grape juice, tomato ketchup, coffee, olive oil, alcohol, mustard, detergent solution, standard household bleach, and a 10% solution of household bleach. The specimens were placed in an upright position and several drops of each reagent were applied. The reagents were allowed to run down the surface. The total exposure time was 24 hours for all reagents, excluding mustard, which was exposed for one hour. Following exposure, the reagents were removed with a clean damp sponge and the specimens were dried with a clean cloth. Section 9.5 Detergent and Water Resistance: A solution of 0.5% liquid dishwashing detergent was prepared. Into the solution, a cellulose sponge was placed. Each specimen was placed edge down onto the sponge and allowed to stand for 24 hours. Following the exposure, the specimens were dried with a clean cloth. The results of the test were as follows: Section 9.2 "Shrinkage and Heat Resistance": The Shrinkage and Heat Resistance test assesses the ability of the finish to withstand high heat for long periods. Following the test, the specimens are visually examined for discoloration and evidence of blistering, checks, or other film failure. No defects or failures were observed following the test. Section 9.3 "Hot and Cold Check Resistance": The results of Hot and Cold Check Resistance provide an assessment of the ability of the finish to withstand hot and cold cycles for prolonged periods. The finish shall show no appreciable discoloration and no evidence of blistering, cold checking, or other film failure when examined. No checking or blistering were observed, however, a discoloration (lightening) of the surface was noted. FIG. 12 illustrates the specimen after this test. Section 9.4 "Chemical Resistance": The Chemical Resistance test evaluates the finish's ability to withstand substances commonly found in the kitchen and bath. Following exposure, each specimen is examined for discoloration, stain, or whitening that will not disperse with ordinary polishing. In the event of a failure, the specimen is permitted to stand for 14 days and is reexamined. The material sufficiently withstood each reagent (except mustard, which was exposed for one hour) for the 24-hour exposure period. The material also sufficiently withstood mustard for the one-hour exposure period. Section 9.5 "Detergent and Water Resistance": The Detergent and Water Resistance test evaluates the proper application of the finish. The finish shall show no delamination, swelling, discoloration, blistering, checking, whitening, or other film failures. Significant discoloration (lightening) was observed in the area that absorbed the solution. FIG. 13 illustrates the specimen after this test.

As further discussed, laminates according to one or more aspects of this disclosure exhibit advantageous qualities, including, as another example, the ability to remain flat relative to the substrates on which they are applied. The flatness-related qualities of certain laminates according to one or more aspects of this disclosure, such as laminates comprising a first resin layer followed by a natural fiber layer, a second resin layer that is thinner than the first resin layer, a non-woven textile layer, and a backing layer, are surprising and counterintuitive, including because one would expect the thicker resin layer of a laminate with two resin layers of differing thicknesses to "pull" harder than the thinner resin layer and thus not remain flat. For instance, having a layup with layers of differing thicknesses may lead to a thicker layer creating an overall pulling effect on one or more layers above or below the thicker layer resulting in a curving or bowing effect of the laminate structure.

Figure 14:
FIG. 14 illustrates a perspective view of the sample used in the flatness-related test conducted in accordance with one or more aspects of the disclosure.

Flatness-related testing was conducted on exemplary embodiments of laminates according to one or more aspects of this disclosure. The testing was conducted in accordance with the EN 13329 standard for laminate flooring, which is incorporated herein fully by reference. The procedure for the test was as follows: A sample of Ekoa® flooring was cut to 22 in.×5 in. The sample thickness was found using digital calipers (which, as shown in Table 4 below, was found to be 0.09 in.). The sample was placed inside a computer numerical control (CNC) machine with a ground plate of tolerance ±1.01 in. A dial indicator with a magnetic base was attached to the CNC machine. The dial indicator was moved until it sat flush with the ground plate. The Z value was recorded. The dial indicator was moved onto the sample in one of four positions. Each position is 2 inches from the corner in each direction towards the center of the flooring piece. The dial indicator was moved until it sat flush with the top of the sample. The Z value was recorded at each position and subtracted from the original Z position. The deviation between the points was calculated to quantify the flatness. The results are illustrated in Table 4 below, and FIG. 14 illustrates the flooring sample used in the test. The mean and variance of the data provided in the "Excess Height (inches)" column of Table 4 were calculated using standard statistical methods. The mean was calculated to be 0.01625 in. The variance was calculated to be 6.36875E-5 in. The EN 13329 specification calls for the largest excess height of the sample to be divided by the length or width to determine a flatness value as a percentage. The Ekoa® sample was curved with the show surface away from the plate and thus was categorized as convex. Flatness can be quantified as the absence of curl. In this test, curl is quantified as the excess height of the material, and its variance as how consistent the curl height is across the entire material. The statistical data shows the mean curl was about 16 thousandths of an inch, and the variance across the sample was about 0.06 thousandths of an inch. When compared to the sample thickness of 0.09 in., the excess height is about an 18% increase. As further shown in Table 4, both the sample width and sample length flatness were within the required values to meet the EN 13329 flatness specification. This sample is within the flatness specification outlined in EN 13329.

TABLE 4

| Sample thickness: 0.09 in. | | |
| --- | --- | --- |
| Position/ Point on Sample | Difference in Z Position Between Top of Sample and Ground Plate (inches) | Excess Height (inches) |
| 1 | 0.097 | 0.007 |
| 2 | 0.119 | 0.029 |
| 3 | 0.105 | 0.015 |
| 4 | 0.104 | 0.014 |
| Characteristic | EN 13329 Specification | ekoa ® Flooring Sample |
| Mean Excess Height (Thickness) | N/A | 18% |
| Flatness (Width Convex) | 0.2% | 0.13% |
| Flatness (Length Convex) | 1.0% | 0.58% |

Another test was conducted in accordance with the ASTM D6866 Biobased Content Testing standard, which is incorporated herein fully by reference. The samples tested were a veneer Ekoa® TP1.3 (MPO015B). The result is reported as "% Biobased Carbon". The test determines the percentage carbon from "natural" (plant or animal by-product) sources versus "synthetic" (petrochemical) sources. As such, 100% Biobased Carbon indicates that a material is entirely sourced from plants or animal by-products and 0% Biobased Carbon indicates that a material did not contain any carbon from plants or animal by-products. The test result was 82% of biobased carbon content.

Another test was conducted in accordance with the Intertek Clean Air (CDPH SM v1.2: SC, PO; ANSI/BIFMA e3-2019e, Sections 7.6.1, 7.6.2, 7.6.3), which is incorporated herein fully by reference. The samples tested were a veneer Ekoa® TP1.3 (MPO015B). The test result was a TVOC range of 0.5 mg/m$^3$ or less.

Another test was conducted in accordance with the ASTM F793/F793M-15, Abrasion Testing, Wall Covering by Use Characteristics, which covers the classification of wall covering according to its serviceability in use, which is incorporated herein fully by reference. The samples tested were a veneer Ekoa® TP1.3 (MPO015B). The number of required cycles: 1000 double rubs was done using a Wyzenbeck Precision Wear Tester equipped with a 220 grit silicon carbide coated abrasive sheet. The tester was operated with a tension of 6 pounds force and the pressure set at 2 pounds force. The wall covering shall have no visual evidence of fiber show-through or damage to the supporting substrate. The sample meets Type III requirements for abrasion resistance in accordance with ASTM F793/F793M-15

Bio sourced materials such as the natural fibers and PLA resin tend to be seen as inferior products with mechanical issues. For example, in the case of wallcovering and cabinetry that could be inferior resistance to abrasion, low breaking strength, poor chemical and heat resistance. However, the above testing shows that the example inputs discussed herein can achieve Type III wallcovering classification on a variety of tests in the W102 specification.

The test samples above contain both long fiber reinforcement (natural fibers) and an amorphous resin matrix, and a backing for cross directional reinforcement. As the W102 results show, the samples above pass the breaking strength in the machine direction and in the transverse direction tests comfortably as a Type III wallcovering, for example.

In certain examples, the specific laminate order may have no effect on the result. Yet in one example, selecting a mechanically strong matrix resin for the cross directional break test may be a consideration, as the fibers provide no support in that direction. Other material related tests may follow the same considerations: for example, shrinkage needs resin that has low shrinkage, and stain resistance needs a chemically inert resin. The same factors are assessed in the KCMA trial discussed above.

The backing, as discussed herein previously, may be used for aesthetic and adherence properties, but the backing may not be needed as part of the W102 or KCMA testing. However, in certain examples, the backing may help for cross directional reinforcement. As discussed above, the backing can be the final backside layer.

Laminates, including those disclosed herein, may be manufactured using many methods. In one example, resin layers are applied in a biaxial orientation as the top and bottom layer with a natural fiber layer in between the biaxial resin layers. The process may be conducted at a constant pressure in the range of about 3 psi to about 300 psi and at a temperature of greater than about 150° F. This method has several advantages, including advantages related to the problem of shrinkage that can be associated with resin layers, which may pose a problem particularly during the impregnation process.

The biaxial resin layers used in the exemplary process may be comprised of materials as described in relation to the first resin layer 110 and the second resin layer 130 of FIG. 1A above and may be comprised of polylactic acid (PLA). The natural fiber layer used in the exemplary process may be comprised of materials as described in relation to the natural fiber layer 120 of FIG. 1A above and may be comprised of flax. In one exemplary embodiment of the process, the biaxial resin layers may each have a thickness of approximately 6 mils, and the natural fiber layer may have a weight/areal density of approximately 200 GSM. In other embodiments, such as embodiments where a laminate of a different thickness is desired, the number of resin layers and/or natural fiber layers may be increased or decreased and, further, the thickness and/or weight/areal density of each layer may be increased or decreased. Further, in another embodiment, the method of manufacturing a laminate with a particular design of the order, or layup, of the layers uses an algorithm that optimizes for various desired outcomes, including but not limited to moisture resistance, flatness, thickness, density, and rigidity. In yet another embodiment, the method of producing a laminate may utilize pellets to film.

In another embodiment of the exemplary process for manufacturing laminates, the resin layers may be non-oriented and may each have a thickness of approximately 10 mils, and the natural fiber layer may have a weight/areal density of approximately 110 GSM. The resin layers of this embodiment may be on the top and bottom with the natural fiber layer in the middle and/or a backing. In further embodiments, a laminate made using the exemplary processes described above may include a combination of non-oriented and oriented resin layers with one or more natural fiber layers and/or backing layers.

All of the different embodiments of the processes described above may include a step of applying an additional backing layer. Any additional backing layer(s) may require different resin layer and/or natural fiber layer thicknesses and/or weights/areal densities to achieve a balanced and flat (planar) structural surface. One exemplary process for making a laminate having a backing layer includes making a laminate with a resin layer comprised of polylactic acid (PLA) with a thickness of approximately 6 mils to 9 mils, followed by a natural fiber layer comprised of flax with a weight/areal density of approximately 110 GSM, followed by another resin layer oriented biaxially and comprised of polylactic acid (PLA) with a thickness of approximately 1.5 mils to 6 mil, followed by a single or multiple non-woven textile layer as the backing layer. In this embodiment, the resin layer in between the natural fiber layer and the backing layer helps to bond the natural fiber layer to the backing layer.

Another example of manufacturing a laminate having resin layers may include using a process in which the rate of shrinkage of the resin layers is controlled to deliberately create a distortion effect in the fibers similar to "figure" in wood. In this embodiment, the laminate may be manufactured using a combination of non-oriented and/or oriented (e.g., biaxial) resin layers with one or more natural fiber layers and/or backing layers.

The above examples can be useful in environments with changing relative humidity and/or high relative humidity.

The above example laminates may avoid a number of issues due to moisture, such as warping, curling, discoloration, degradation, and related problems. The above example laminates can be used in environments, such as those exposed to elevated relative humidity, including, for example, furniture, walls, floors, ceilings, panels, doors in living spaces, and transportation interiors.

In the above examples, red list chemicals may be avoided. Thermoset chemistry is a known carcinogen as per California prop 65 and may be avoided. Also wood veneer requires trees and thus deforestation. Wood veneer also requires a finish layer of thermoset chemistry which a known carcinogen as per California prop 65. The above examples may be used in place of wood veneer to mitigate deforestation and to avoid use of thermoset chemistry.

Also in the above examples, applying a secondary finishing process such as painting of a clear coat made of polyurethane, polyester or other types of paints to encapsulate a top layer or skin to reduce moisture absorption by the resin and fibers may in certain examples be avoided. This may help in certain instances to reduce the labor and expense in the finishing process, avoid finishing chemicals that have high VOCs (thus designated as carcinogenic as per California proposition 65). Additionally, non-VOC solutions are not sufficiently abrasion or moisture resistant meaning that VOCs are difficult to avoid in secondary finishing processes. The above examples may provide more choices in the application of textures, as in certain examples, secondary finishing processes may have limited amounts of finishing textures.

The example composite layups and manufacturing processes discussed herein have a bio composition, a low VOC content, commercial grade strength, and are fully integrated. The example composite layups and manufacturing processes discussed herein can be tailored to produce a wide variety of aesthetic veneer-like products without significantly compromising bio composition, low VOC content, commercial grade strength, and integration.

The above test results shown that the example composite layups discuss herein can be used as a wallcovering or panel veneer through the KCMA and W102 testing results. Also the composite layups discussed here in have a bio composition and are sustainable. Despite bio materials are often regarded as inadequate mechanically, the composite layups discussed herein have a its high degree of physical and chemical resistance as proven by TYPE III wallcovering classification in nearly all physical wallcovering characteristics without any additional finish.

In an example, a laminate for applying to a substrate surface is provided. The laminate can include a plurality of layers. The plurality of layers can include a first resin layer comprising a first resin layer thickness and a first resin layer inner surface. The first resin layer inner surface can be located at a first resin layer distance from the substrate surface. A natural fiber layer may include a natural fiber layer thickness and a natural fiber layer inner surface. The natural fiber layer inner surface may be located at a natural fiber layer distance from the substrate surface, and the natural fiber layer distance can be less than the first resin layer distance. A second resin layer can include a second resin layer thickness and a second resin layer inner surface. The second resin layer inner surface can be located at a second resin layer distance from the substrate surface. The second resin layer distance can be less than the natural fiber layer distance. The second resin layer can be configured to prevent the plurality of layers from curling. The plurality of layers may define a top surface and an application surface.

The top surface may be located at a top surface distance from the substrate surface. The top surface distance can be substantially uniform along the substrate surface. The second resin layer can be configured to help maintain the top surface distance substantially uniform along the substrate surface. And the application surface may be configured to be applied to the substrate surface.

In an example, the plurality of layers may include a first non-woven textile layer comprising a first non-woven textile layer thickness and a first non-woven textile layer inner surface. The first non-woven textile layer inner surface can be located at a first non-woven textile layer distance from the substrate surface. The first non-woven textile layer distance can be less than the second resin layer distance. The plurality of layers further can include a backing layer comprising a backing layer thickness and a backing layer inner surface. The backing layer inner surface can abuts the substrate surface.

The plurality of layers can include a second non-woven textile layer comprising a second non-woven textile layer thickness and a second non-woven textile layer inner surface. The second non-woven textile layer inner surface can be located at a second non-woven textile layer distance from the substrate surface, and the second non-woven textile layer distance can be less than the first non-woven textile layer distance.

The plurality of layers can further comprise a third resin layer comprising a third resin layer thickness and a third resin layer inner surface. The third resin layer inner surface can be located at a third resin layer distance from the substrate surface, and wherein the third resin layer distance is less than the first non-woven textile layer distance.

The plurality of layers can further include a backing layer comprising a backing layer thickness and a backing layer inner surface. The backing layer inner surface can abut the substrate surface.

The plurality of layers may further include a backing layer comprising a backing layer thickness and a backing layer inner surface. The backing layer inner surface can be located at a backing layer distance from the substrate surface. The backing layer distance may be less than the natural fiber layer distance, and the backing layer distance can be greater than the second resin layer distance; and a cork layer comprising a cork layer thickness and a cork layer inner surface, and the cork layer inner surface may abut the substrate surface.

The plurality of layers may further include a backing layer having a backing layer thickness and a backing layer inner surface. The backing layer inner surface may be located at a backing layer distance from the substrate surface. The backing layer distance may be less than the natural fiber layer distance, the backing layer distance may be greater than the second resin layer distance; and a first non-woven textile layer may include a first non-woven textile layer thickness and a first non-woven textile layer inner surface, the first non-woven textile layer inner surface may abut the substrate surface.

The first resin layer may include polylactic acid, the natural fiber layer may include flax, the second resin layer may include polylactic acid. The first non-woven textile layer may include polyester, and the backing layer may include cellulose. The first resin layer may include a non-oriented polylactic acid, the second resin layer may include a biaxially oriented polylactic acid.

The first resin layer thickness can be 10 mils, the second resin layer thickness can be 1.5 mils, and the backing layer thickness can be 10 mils.

The plurality of layers can be configured to prevent an amount of moisture from contacting the natural fiber layer, and the amount of moisture may be less than 4% by weight.

The top surface distance can be substantially uniform along the substrate surface after 24 hours of being applied to the substrate surface.

The top surface distance may be substantially uniform along the substrate surface after 6 hours of being applied to the substrate surface in an environment comprising relative humidity greater than 30%.

The first resin layer thickness may be between about 6 mils. and 12 mils., the second resin layer thickness can be between about 1.5 mils. and 5 mils. The natural fiber layer may be configured to absorb excess resin and stabilize the flatness of the laminate. The laminate can be a Type III wallcovering. The laminate may include a backing layer and the backing layer can be a dry layer to allow for adhesion to a substrate.

In another example, a laminate for applying to a substrate surface may include a plurality of layers, the plurality of layers can include a first resin layer comprising a bioplastic and first resin layer thickness, a natural fiber layer comprising a natural fiber layer thickness, wherein the natural fiber layer abuts the first resin layer; and a second resin layer can include a bioplastic and second resin layer thickness. The second resin layer can abut the natural fiber layer. The second resin layer thickness can be less than the first resin layer thickness. The laminate may include a backing layer having a backing layer thickness. The backing layer can abut the second resin layer, and the backing layer is a dry layer to allow for adhesion to a substrate. The plurality of layers comprising the first resin layer, the natural fiber layer, and the second resin layer may provide a substantially flat top surface.

The first resin layer may include polylactic acid, the natural fiber layer can include flax, and the second resin layer can include polylactic acid. The first resin layer can include a non-oriented polylactic acid, and the second resin layer can include a biaxial orientation. The first resin layer thickness can be between about 6 mils and 12 mils, and the second resin layer thickness can be between about 1.5 mils. and 5 mils. The natural fiber layer may have an areal weight of between about 50 to 200 GSM. In one example, the plurality of layers can further include a first non-woven textile layer comprising a first non-woven textile layer thickness. The first non-woven textile layer can abut the second resin layer. The plurality of layers can further include a backing layer comprising a backing layer thickness. The backing layer can abut the first non-woven textile layer or the second resin layer. The backing layer can be a dry layer to allow for adhesion to a substrate.

The plurality of layers may further include a first non-woven textile layer having a first non-woven textile layer thickness, and the first non-woven textile layer can abut the second resin layer.

The plurality of layers can further include a backing layer having a backing layer thickness, the backing layer can abut the first non-woven textile layer, and the backing layer can abut the substrate surface.

In another example, a method of producing a laminate for applying to a substrate surface, may include preparing a plurality of layers, which may include preparing a first resin layer having a first resin layer thickness; preparing a natural fiber layer having a natural fiber layer thickness; preparing a second resin layer having a second resin layer thickness; and at a constant pressure of from about 3 psi to about 300 psi and at a temperature of greater than about 150° F.:

applying the first resin layer to a top side of the natural fiber layer; applying the second resin layer to a bottom side of the natural fiber layer; and orienting the second resin layer biaxially relative to the first resin layer; and wherein the plurality of layers define a top surface and an application surface, wherein the top surface is located at a top surface distance from the substrate surface, wherein the top surface distance is substantially uniform along the substrate surface, and wherein the application surface is configured to be applied to the substrate surface In another example, a material can include a laminate which may include a plurality of layers. The plurality of layers may include a first resin layer comprising a first resin layer thickness; a natural fiber layer comprising a natural fiber layer thickness, wherein the natural fiber layer can abut the first resin layer a second resin layer can include a second resin layer thickness, the second resin layer can abut the natural fiber layer, and a backing layer, and the backing layer can assist in adhesion to a substrate. The second resin layer can be configured to maintain the plurality of layers in a substantially flat configuration. The first resin layer melting point can be low enough to prevent the natural fibers from degrading. The backing layer can be a dry layer to allow for adhesion to a substrate, and the second resin layer can be configured to prevent the plurality of layers from curling. The plurality of layers can be configured to mimic a wood veneer. The first resin layer can be configured to act as protective layer to the natural fibers during manufacturing and the second resin layer may be configured to provide excess resin for protection and to prevent excess outflow of resin from the first resin layer through the composite.

The natural fiber layer may be configured to absorb excess resin and stabilize flatness of the laminate. In one example, the laminate is a Type III wallcovering for at least one category in accordance with the W-102 (2019), WA Quality Standard for Wallcovering/Alternative Constructions.

The ratio of the first resin layer thickness to the second resin layer thickness can be greater than 3. The backing layer can include a first surface and a second surface and the backing layer can be configured to prevent resin from bleeding through the second surface. In one example, the laminate can be configured to meet a flatness specification outlined in the EN 13329 standard for laminate floorings. The laminate can further comprise a nonwoven layer configured to stabilize flatness of the laminate.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

The invention claimed is:

1. A laminate for applying to a substrate surface, the laminate comprising:

a plurality of layers, the plurality of layers comprising:

a first resin layer comprising a first resin, the first resin layer having a first resin layer thickness, wherein the first resin layer thickness is between about 3 mils and 11 mils;

a natural fiber layer comprising a natural fiber material, the natural fiber layer having a natural fiber layer thickness between about 7 mils and 20 mils, wherein the natural fiber layer abuts the first resin layer;

a second resin layer comprising a second resin, the second resin layer having a second resin layer thickness, wherein the second resin layer thickness is between about 1.5 mils and 5 mils, and wherein the second resin layer abuts the natural fiber layer;

a first non-woven textile layer, wherein the first non-woven textile layer abuts the second resin layer; and a backing layer configured to allow for adhesion to a substrate, wherein the backing layer abuts the first non-woven textile layer; and wherein the first resin comprises a non-oriented thermoplastic resin, wherein the second resin comprises a biaxially oriented thermoplastic resin.

2. The laminate of claim 1 wherein the natural fiber layer is configured to absorb excess resin and stabilize the flatness of the laminate.

3. The laminate of claim 1 wherein the laminate meets Type III wallcovering test standards for breaking strength in a machine direction and in a transverse direction.

4. A laminate for applying to a substrate surface, the laminate comprising:

a plurality of layers, the plurality of layers comprising:

a first resin layer comprising a bioplastic and first resin layer thickness, wherein the first resin layer thickness is between about 6 mils and 12 mils;

a natural fiber layer comprising a natural fiber layer thickness, wherein the natural fiber layer abuts the first resin layer; and a second resin layer comprising a bioplastic and second resin layer thickness, wherein the second resin layer abuts the natural fiber layer, and wherein the second resin layer thickness is between about 1.5 mils and 5 mils;

a backing layer comprising a backing layer thickness, wherein the backing layer is a dry layer to allow for adhesion to a substrate, and wherein the backing layer abuts the second resin layer;

wherein the plurality of layers comprising the first resin layer, the natural fiber layer, the second resin layer, and the backing layer provide a substantially flat top surface.

5. The laminate of claim 4 wherein the first resin layer comprises a thermoplastic and wherein the second resin layer comprises a thermoplastic.

6. The laminate of claim 5 wherein the first resin comprises a non-oriented thermoplastic and the second resin layer comprises a biaxially oriented thermoplastic.

7. The laminate of claim 4 wherein the natural fiber layer has an areal weight of between about 50 to 200 GSM.

8. A material comprising:

a laminate comprising a plurality of layers, the plurality of layers comprising:

a first resin layer comprising a first resin layer thickness, wherein the first resin layer thickness is between about 6 mils and 12 mils;

a natural fiber layer comprising a natural fiber layer thickness, wherein the natural fiber layer abuts the first resin layer;

a second resin layer comprising a second resin layer thickness, wherein the second resin layer abuts the natural fiber layer, and wherein the second resin layer thickness is between about 1.5 mils and 5 mils; and a backing layer, wherein the backing layer assists in adhesion to a substrate;

wherein the second resin layer is configured to maintain the plurality of layers in a substantially flat configuration.

9. The material of claim 8 wherein the first resin layer melting point is low enough to prevent the natural fibers from degrading.

10. The material of claim 8 wherein the backing layer is a dry layer to allow for adhesion to a substrate, and wherein the second resin layer is configured to prevent the plurality of layers from curling.

11. The material of claim 8 wherein the plurality of layers are configured to mimic a wood veneer.

12. The material of claim 8 wherein the first resin layer is configured to act as protective layer to the natural fibers during manufacturing and wherein the second resin layer is configured to provide protection and to prevent outflow of resin from the first resin layer through the laminate.

13. The material of claim 8 wherein the natural fiber layer is configured to absorb resin and stabilize flatness of the laminate.

14. The material of claim 8 wherein the laminate is a Type III wallcovering for at least one category in accordance with the W-102 (2019), WA Quality Standard for Wallcovering/ Alternative Constructions.

15. The material of claim 8 wherein the ratio of the first resin layer thickness to the second resin layer thickness is greater than 3.

16. The material of claim 8 wherein the backing layer comprises a first surface and a second surface and wherein the backing layer is configured to prevent resin from bleeding through the second surface.

17. The material of claim 8 wherein the laminate further comprises a nonwoven layer configured to stabilize flatness of the laminate, wherein the nonwoven layer abuts the second resin layer, and wherein the backing layer abuts the nonwoven layer.

* * * * *